(12) United States Patent
Hansson et al.

(10) Patent No.: US 7,721,552 B2
(45) Date of Patent: May 25, 2010

(54) METHOD FOR OPERATION OF A GAS TURBINE GROUP

(75) Inventors: Hans-Erik Hansson, Finspang (SE); Mats Westermark, Taby (SE)

(73) Assignee: Euroturbine AB (SE)

( * ) Notice: Subject to any disclaimer, the term of this patent is extended or adjusted under 35 U.S.C. 154(b) by 1057 days.

(21) Appl. No.: 10/558,849

(22) Filed: Nov. 30, 2005

(65) Prior Publication Data

US 2006/0248896 A1 Nov. 9, 2006

(30) Foreign Application Priority Data

May 30, 2003 (SE) .................................... 0301585

(51) Int. Cl.
*F02C 3/30* (2006.01)

(52) U.S. Cl. ...................... 60/775; 60/39.511; 60/39.54

(58) Field of Classification Search .................. 60/775, 60/39.182, 39.511, 39.54, 39.55, 39.3, 39.53, 60/728

See application file for complete search history.

(56) References Cited

U.S. PATENT DOCUMENTS

| 4,272,953 | A | | 6/1981 | Rice | |
|---|---|---|---|---|---|
| 5,212,942 | A | * | 5/1993 | Malohn | ........................ 60/784 |
| 5,386,685 | A | * | 2/1995 | Frutschi | ........................ 60/783 |
| 5,771,678 | A | | 6/1998 | Shouman | |
| 6,178,735 | B1 | * | 1/2001 | Frutschi | ........................ 60/772 |
| 6,226,974 | B1 | | 5/2001 | Andrew | |
| 6,588,196 | B1 | * | 7/2003 | Bahr et al. | ................ 60/39.182 |

(Continued)

FOREIGN PATENT DOCUMENTS

GB 2187273 9/1987

(Continued)

OTHER PUBLICATIONS

International Search Report PCT/SE2004/000822 dated Aug. 30, 2004.

(Continued)

*Primary Examiner*—William H Rodriguez
(74) *Attorney, Agent, or Firm*—Ostrolenk Faber LLP (57) ABSTRACT

A method of operating a gas turbine power plant comprising of a first gas turbine group, consisting of a compressor and a turbine which are connected mechanically with one another, and a second gas turbine group, including a combustion device, which is placed in the gas flow stream between the first group's compressor and turbine, whereby the second gas turbine group consists of a compressor, a fuel injection device, a combustion chamber and a turbine, whereby the second gas turbine group's compressor and turbine are mechanically coupled to one another and at least one of the gas turbine groups having a device for the extraction of work, whereby the fact that a first flow of water and/or steam is heated with heat from the flue gas from the first group's turbine, that further amounts of water and/or steam are heated with heat from a gas stream that is compressed by the first group's compressor, and the produced water and/or steam is injected into the gas stream in such amounts that at least 60% of the oxygen content of the air in the stream is consumed through combustion in the combustion device, and in that the combustion gas that is fed into the turbine of the second gas turbine group has a pressure in the range 50-300 bar.

21 Claims, 3 Drawing Sheets

U.S. PATENT DOCUMENTS

| | | |
|---|---|---|
| 2002/0106001 A1 | 8/2002 | Tomlinson |
| 2003/0070415 A1* | 4/2003 | Hatamiya et al. ........ 60/39.511 |
| 2007/0006592 A1* | 1/2007 | Balan et al. ................... 60/772 |

FOREIGN PATENT DOCUMENTS

| | | |
|---|---|---|
| JP | 63-147931 | 6/1988 |
| JP | 2-45620 | 2/1990 |
| JP | 7-4211 | 1/1995 |
| JP | 2001-20760 | 1/2001 |
| JP | 2001-140657 | 5/2001 |
| JP | 2001-289008 | 10/2001 |
| JP | 2002-522705 | 7/2002 |
| JP | 2002-357320 | 12/2002 |
| JP | 2003-74375 | 3/2003 |
| WO | WO 00/09875 | 2/2000 |

OTHER PUBLICATIONS

English translated Office Action issued by the Japanese Patent Office, mailed Oct. 27, 2009 in connection with corresponding Japanese Patent Application No. 2006-508565.

* cited by examiner

METHOD FOR OPERATION OF A GAS TURBINE GROUP

CROSS REFERENCE TO RELATED APPLICATIONS

The present application is a 35 U.S.C. §371 national phase conversion of International Application No. PCT/SE2004/000822 filed May 28, 2004, which claims priority from Swedish patent application No. 0301585-6 filed May 30, 2003.

BACKGROUND OF THE INVENTION

This invention concerns a method for the operation of a gas turbine cycle whose art is presented in the introduction of the first claim.

It is already known that the same operational conditions are, in certain cases, reached by a gas turbine cycle of the art described in claim 1, whereby water and/or steam is heated with flue gases from the expander of the said gas turbine cycle during operation.

In traditional gas turbines, air is used as the working fluid. The intake air is compressed to high pressure after which fuel is mixed with the compressed air. This mixture is then combusted in a combustion chamber and expanded through a turbine. This turbine produces work, a part of which is used to drive the compressor, while the excess is extracted as useful work. The efficiency of this process can be described as the ratio between the useful work and the energy content of the fuel utilised. In traditional gas turbine cycles, the combustion process occurs with a large amount of excess air; consequently, a majority of the intake air passes through the cycle without its oxygen content being utilised.

It is already known that gas turbine power plants may be designed as a so-called humidified cycle. In a humidified cycle, water is mixed with the working fluid. This water may be injected as steam and/or hot water may be used to humidify a part of, or the entire compressed air flow. Steam is usually generated in a heat recovery steam generator that utilises the heat contained in the flue gases from the turbine.

However, in practice, a traditional "dry" gas turbine, which is optimised for operation with dry air as the working fluid, exhibits unacceptable operational characteristics if large amounts of water are injected into the working fluid. This is because the gas flow through the turbine expander is significantly greater then the flow rate for which it is dimensioned for.

Traditional gas turbines can, therefore, not be operated as humidified cycles. Of those few gas turbines that do utilise steam injection, the amount of steam that may be injected into the working fluid is limited, and consequently not all the steam available from the heat recovery steam generator may be utilised.

If humidified cycles are to be realised, a large and costly re-design of the gas turbine machinery is necessary to accommodate the changed flow distribution and imbalance between the volume capacity of the compressor and turbine.

In addition, traditional gas turbines often cool the hot temperature regions of the turbine by utilising cold cooling air from the compressor; thus, the compressor has a certain overcapacity in the form of this cooling air. In humidified cycles, however, it is significantly advantageous to utilise steam for cooling instead of compressed air. This further increases the degree to which the gas turbine must be re-designed, as the imbalance between the volume capacity of the compressor and turbine becomes even larger when steam cooling is introduced. Thereby, extra measures must be implemented to adapt existing, air-cooled gas turbines to ones with more effective steam cooling.

While it is already known that gas turbine cycles may be utilised and operated as described in the introduction of claim 1, one further goal with the current invention is to remove the above-mentioned re-design problems associated with humidified cycles and to propose configurations that offer especially high efficiencies and favourable operating conditions.

An additional goal of the invention is to introduce a method that enables the effective operation of the second gas turbine group in such a way that a near-optimal operation of the first gas turbine group in a humidified cycle is obtained, despite the fact that the first gas turbine group has a design which in essence is optimised for a dry cycle.

SUMMARY OF THE INVENTION

A further purpose of the invention is to propose a configuration that enables a first gas turbine group, which may be a traditional stand-alone gas turbine unit, to be operated as a humidified cycle. Thereby, the traditional gas turbine unit may be an existing device which can be complemented/retrofitted with the second gas turbine unit. Alternatively, the traditional gas turbine unit can be newly manufactured from a well-known and extensively tested design that has been produced and in operation previously. In this way, the newly manufactured first gas turbine group is well known, has desirable operational characteristics, a good efficiency and an existing maintenance and service infrastructure.

An additional purpose of the invention is to propose operating parameters which favourably affect the performance of the gas turbine groups.

These purposes are achieved entirely or partially through the invention.

The invention is defined in the attached patent claim 1.

The configurations of the invention are given in the appended independent claims. The additional aims of the inventions are obtained entirely or partially through claim 1 or through one or more of the additional, dependent patent claims attached.

The first gas turbine group can comprise of a unit that is well tested and optimised for "dry" operation. Currently, there is a great deal of experience concerning the long-term operation, performance and maintenance of these "dry" gas turbines. Furthermore, the combined operation of the compressor and turbine parts is well understood in traditional operation (non-humidified cycle). The combustion device and the second gas turbine group are dimensioned so that the first gas turbine group can operate optimally, despite the fact that it is now a part of a humidified cycle. A significant proportion, for example, at least 10% and preferably 20%, of the produced work is preferably obtained from the power transmission of the second gas turbine group.

The first gas turbine group can be an existing unit, which operates with non-humidified conditions in an existing plant, that is complemented with the second gas turbine group, combustion device and steam injection and/or humidification device to achieve a humidified cycle for the entire gas turbine cycle.

Alternatively, the humidified cycle may be newly designed and produced but based on a first gas turbine group that is a conventional gas turbine with a compressor and turbine on a common shaft and technically well-proven for operation in non-humidified conditions.

Through the choice of compressor and turbine units, the second gas turbine group can be easily adapted to give a desired pressure distribution between its inlet and outlet gas steams. By complementing the first gas turbine group with the second gas turbine group, the first gas turbine group thus obtains a new, near-optimal set of operating conditions when converted to a humidified cycle.

In practice, the exit flue gas volumetric flow rate for which the first gas turbine group is constructed for is kept within its original operating range. As a large proportion of this turbine outlet flow is steam in a humidified cycle, the mass flow rate of air from the original compressor must therefore be reduced. This reduction may be achieved through either removing a compressor stage or utilising regulation of the inlet guide vanes, as explained further below. Either method will result in a reduced pressure ratio for the first gas turbine group's compressor compared to its original design. Hence, from having approximately equal pressure ratios for the compressor and turbine parts, the new, humidified configuration implies that the compressor of the first gas turbine group will have a considerably smaller pressure ratio than its corresponding original design.

The above configuration gives the best potential efficiency for the humidified gas turbine cycle. Firstly, the turbine of the first group operates near its original, optimised design parameters in regards to velocity triangles and loss levels. Secondly, the lower mass flow rate through the compressor, as mentioned, reduces the pressure ratio and will therefore also reduce the amount of power consumed. Thereby, the amount of useful work obtained from the first gas turbine group increases to the degree possible in conjunction with humidified gas turbine cycles.

A reduced pressure ratio for the compressor of the first gas turbine group will also lead to a reduced gas stream density in this compressor. Thereby, the gas stream is favourably adapted to the compressor's original geometry, despite the fact that the mass flow through the compressor is reduced. This favourable effect is small in the first inlet stage of the compressor and hence it can be more effective to remove a compressor stage instead of regulating the compressor. The latter is also possible as the compressor load decreases due to the reduced pressure ratio when switching to a humidified cycle.

The second gas turbine group works in a temperature range where cooling is required and can be advantageously provided by utilising steam or cool humid air. The steam may participate in this process in a very advantageous way by first cooling the high temperature components before being introduced to the combustion chamber. Thereby, this steam may also participate in the expansion process and provide additional work. However, a part of the steam will, of necessity, be used for film cooling in parts where convection does not give the necessary cooling duty. This film cooling, where the steam acts as a protective layer between the gas stream and the metal, is very effective when using steam due to steam's higher heat capacity compared to the humid gas mixture.

The first gas turbine group will work with conditions that do not require, or at most, only require a limited amount of cooling. The existing distribution of cooling air in the original "dry" design of this turbine group may therefore be drastically reduced and instead allow a larger flow of working fluid in the turbine.

Therefore, all the advanced development required to transform the first gas turbine group to a humidified cycle is concentrated in the second gas turbine group. The first gas turbine group requires only minor, and less critical, changes. These changes are as follows: an extraction point for the compressed air to be lead to the second group; the existing combustion chamber is replaced with a new "cool" gas inlet distribution duct; lastly, a new, more powerful shaft is introduced.

The optimal efficiency for a dry process, i.e., for a conventional gas turbine cycle, is obtained at the relatively low pressure ratios of 5-40 bar. However, the optimal efficiency is at much higher pressure ratios for humidified cycle. Consequently, it is important to increase the pressure ratio in humidified gas turbine cycles in order to reach the optimal operating conditions. A suitable pressure region for the suggested cycle is 50-300 bar, preferably 60-200 bar and if possible 80-150 bar. Temperature levels are between 1000-2000 K, preferably 1200-1800 K.

In certain humidified cycle configurations suggested in this invention, the addition of water can be so great that combustion occurs as close to stoichiometric conditions as practically possible, i.e., nearly all oxygen contained in the air is utilised. This is one of the most primary objectives when operating the suggested cycle.

Combustion at near-stoichiometric conditions leads to an effective, compact and cost-effective cycle. The water which has participated in the process is not emitted to the environment, but can be retained in the cycle through flue gas condensing. The condensate obtained can be continuously treated and recirculated to the power cycle. The process of flue gas condensing is eased by near-stoichiometric combustion and the cycle may hence be made water self-sufficient. Condensing water from the flue gas also helps removes particles and, to some degree, contaminants from the flue gases. Hence, the least possible environmental impact is made. Near-stoichiometric combustion also implies that the flue gas flow to the environment is minimized. As such the methods proposed to separate carbon dioxide from power plant flue gases become significantly cheaper for this invention, as the flow through any clean-up process decreases and the concentration of carbon dioxide is higher. The plant operation should be designed such that at least 70%, suitably 80%, and preferably 90% of the oxygen content of the intake air is consumed. This represents a major deviation from the existing technology and gives the advantages named above.

It is assumed that the water in the cycle may be recycled. The evaporation of water occurs partly in a boiler, in certain cases with two pressure levels, which takes its heat from the hot flue gases and from cooling the compressor air from the first gas turbine unit. The cooled flue gases are led to a flue gas condenser that condenses water from the gas stream, usually in amounts that render the plant water self-sufficient. The large amounts of heat that are obtained when condensing this water can, for example, be utilised in a district heating network or to drive an absorption chiller.

The net result of introducing steam into the traditional gas turbine process is to increase the efficiency and output of useful work. Modern, well-developed, conventional gas turbines that work without the injection of steam usually have efficiencies of 35-40%. Well-developed humidified gas turbine cycles that operate with similar pressure and temperature levels usually obtain efficiencies of approximately 50-55%. Humidified cycles that operate with higher pressure levels obtain efficiencies around 55-65% and useful work extracted will be 2-3 times higher than its corresponding conventional gas turbine process.

In order for the cycle to operate efficiently and feasibly with the pressure ratios required to reach 50-300 bar, at least two, or for the highest pressure levels, three shafts with differing rotational speeds must be used. The high-pressure compressor and turbine would operate with the higher rotational speed. Hence, a multiple-shaft solution would comprise of a conventional gas turbine unit operating on one shaft, a second compressor and turbine operating on a separate shaft that rotates at higher speeds, and a combustion chamber which works at high pressures and temperatures, a near-stoichiometric combustion and is preferably cooled with steam. Steam and/or water can even be introduced through injecting high-pressure steam before the combustion chamber or by humidifying the air in a humidification tower or through injecting intermediate-pressure steam and/or water prior to the last compression stage.

When operating at higher pressures, the need to cool the air between the compressors increases; in part to reduce the temperature level and material demands in the compressor, and in part to reduce the amount of compressor work required.

Lowering the temperature of the intermediate-pressure air can also lead to more advantageous conditions for combustion. The easiest way to reach lower temperatures is to spray water into the compressed air stream. Alternatively, the heat contained in the compressed air can be utilised to produce steam in a boiler. A further, and especially effective method, is to utilise a so-called humidification tower. In this device, the high-pressure compressed air is humidified in direct, counter-current contact with hot water. The hot water is cooled by this process and can then collect heat from the flue gas or the intermediate-pressure air, thereby reducing cycle losses.

In order to introduce further amounts of water to the humidified cycle, the intake air to the compressor may be humidified. This solution is particularly advantageous in connection to the extraction of low-temperature heat, e.g., district heating, from the gas turbine cycle. Heat from the flue gas can be used for this humidification process; thus recycling energy within the cycle and increasing the total utilisation of energy in this process.

BRIEF DESCRIPTION OF THE DRAWINGS

The invention will be described in the following examples with reference to the attached figures.

DESCRIPTION OF A PREFERRED EMBODIMENT

Figure 1:
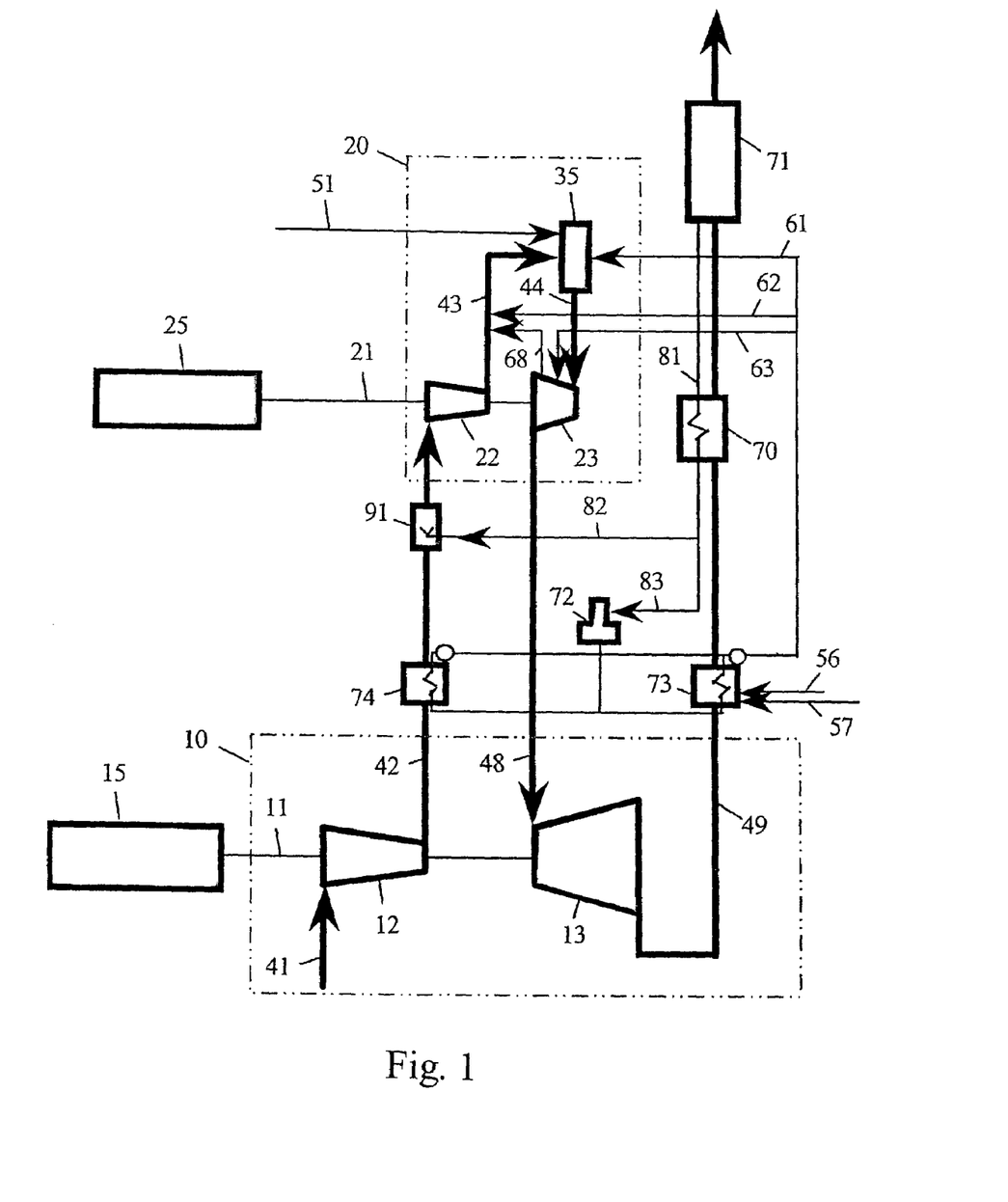
FIG. 1 illustrates schematically a gas turbine cycle in accordance to the invention with heat utilised by a boiler 74 after the first gas turbine group's compressor 12, and further with the injection of water in the air stream between the compressors 12 and 22.

FIG. 1 shows a first gas turbine group 10 comprising of an axle 11, which is connected to a compressor 12 and a turbine 13. The first gas turbine group 10 is dimensioned and designed as a traditional gas turbine that is meant for conventional operation with just air as the working fluid. An electricity generator 15 is shown connected to the axle 11. Alternatively, work can be extracted from the first gas turbine group 10, via the axle 11, to another device.

FIG. 1 also shows a second gas turbine group 20 that includes a turbine 23, a compressor 22 and an axle 21, which is shown connected to an electricity generator 25 or to another device that can utilise the work transferred through the axle 21.

The axle 11, which is connected to the first gas turbine group 10, as well as axle 21, which is connected to the second gas turbine group 20, can both be connected to a common device which utilises the net work provided by the two groups.

Air is taken in from the atmosphere via 41 to the compressor 12, led further in stream 42 to the compressor 22 and then further through 43 to the combustion chamber 35. Here, fuel is added through 51 and water or steam through 61. Steam can also be introduced through 62 and mixed with the flow in 43 prior to the combustion chamber 35. The combustion gases are taken via 44 to the turbine unit 23.

To cool the high temperature sections of the turbine, a part of the steam flow is led via 63 to the turbine unit 23. The part of the steam that is not mixed with the main stream through turbine 23 is then led to the combustion chamber, for example, via the pipe 68.

The exit flow from turbine 23 is led via 48 to another turbine 13. The exit flow from the turbine 13 is led through 49 that contains a boiler 73, a heat exchanger 70 and downstream of this, a flue gas condenser 71. The water condensate from the flue gas condenser 71 is led through a pipe 81 which passes through the heat exchanger 70 and further to the pipes 82 and 83. The deaerator 72 has the purpose of ensuring the water supplied to the boilers 73 and 74 is free of oxygen.

The compressor outlet extraction device 42 collects the pressurised air from the first gas turbine group's compressor 12 and directs it to the high pressure compressor 22. The turbine inlet device 48 introduces the flue gas from turbine 23 into the first gas turbine group's turbine 13. Both these devices are sealed off from axle 11 to allow a pressure difference between the two devices. In the present described configuration the pressure in the return device 48 is typically 10-40% higher than the pressure in the extraction device 42. This is significantly different from conventional gas turbines, where the pressure after compressor 12 is only slightly higher than that before turbine 13.

FIG. 1 illustrates schematically that some of the condensate heated in heat exchanger 70 can be led via pipe 82 to an adiabatic humidifier 91, where the it is sprayed into the air stream contained in 42. The spray-humidifier is placed preferably after the heat exchanger 74 in, stream 42.

FIG. 1 also illustrates that the water heated in heat exchanger 70 can, via pipe 83, be sent to the heat exchanger 73 and/or heat exchanger 74, prior to entering the combustion chamber 35 via the above-described pathways 61, 62, and/or 63. The heat exchangers 73 and 74 are boilers, where 74 is placed in the gas path 42 to cool the air stream between the compressors 12 and 22, while 73 is placed in the flue gas path 49 to cool the flue gases. In this manner, the steam generated does not need to pass through a compressor.

Figure 2:
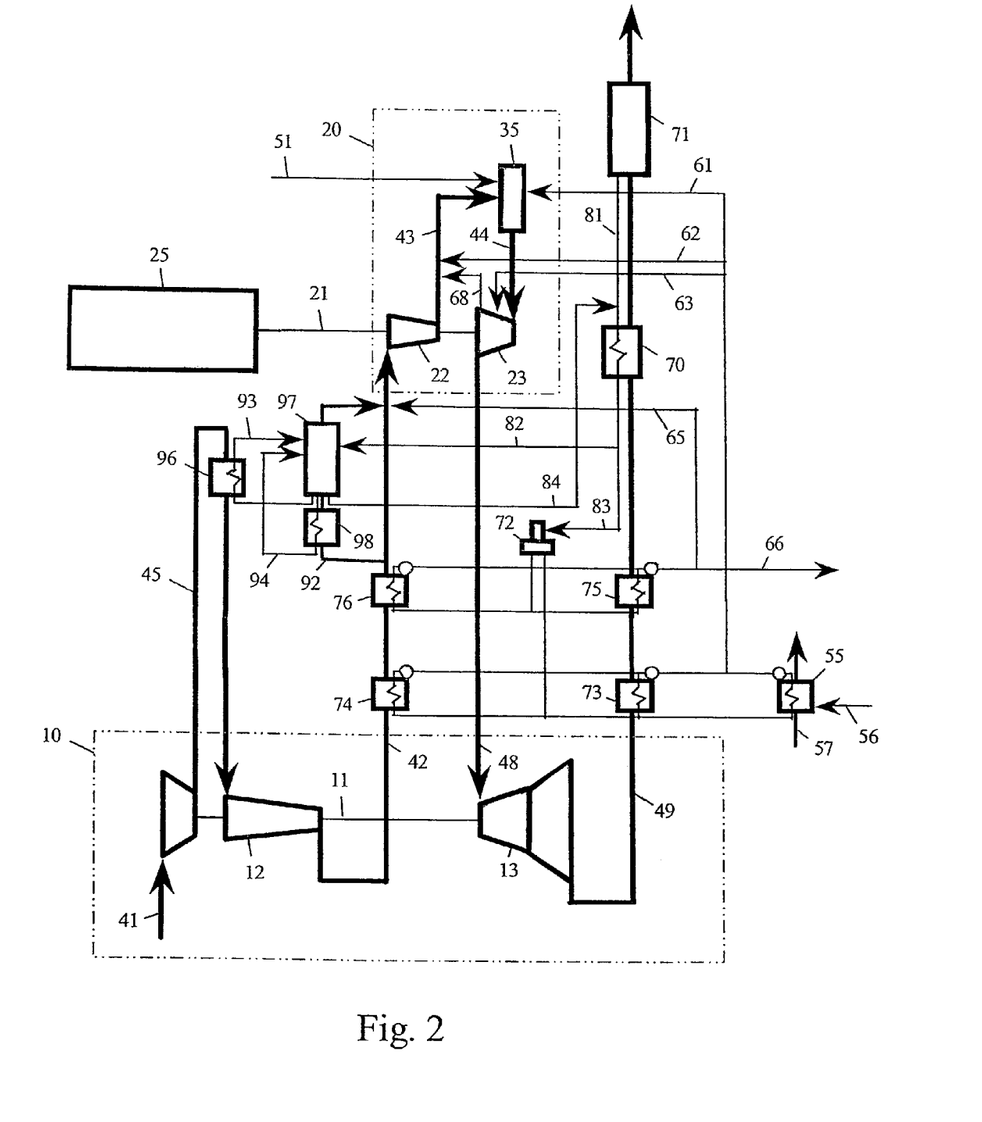
FIG. 2 illustrates a further development of the gas turbine cycle according to FIG. 1 with the production of steam in two stages, a final humidification of the air stream between the compressors, which also includes the utilisation of heat from an earlier intercooler and a configuration where useful work is extracted from the second gas turbine group 20 only.

FIG. 2 shows an alternative solution where heat recovery in the air stream between the compressors and in the flue gas stream can in part be carried out with boilers operating with two pressure levels, whereby the lower steam pressure is set such that the steam formed can be injected in the gas path 42 between the compressors.

FIG. 2 shows a cycle configuration where steam from the lower pressure level is extracted for use in an external process via pipe 66.

FIG. 2 also shows a form of compressor outlet cooling, where heat from the cooled compressor air is used to evaporate water in a humidification vessel and a part of the pressurised air from compressor 12 takes part in this humidification process. As shown in FIG. 2, heat is transferred to the humidification circuit in part from cooling the air prior to humidification, in part from cooling the compression process, and in part from cooling the flue gas. This heat is transferred to the humidification circuit at those temperature levels most suitable for the total process, although not above the boiling point at the humidification tower pressure.

In FIG. 1-2, the high-pressure steam can be utilised as a cooling media for the combustion chamber via 61 and the hot turbine sections via 63 or even injected directly via 62 at the combustion chamber's 35 entrance. If there are insufficient amounts of steam for cooling (e.g. during start-up or part-load), boiler 55 can be fired externally (by fuel 56 and air 57) to complement steam production by means of the boilers 73 and 74 and ensure the availability of sufficient cooling media. The steam which possibly is produced by a preferably preheated water flow 70 that is fed into the heat exchanger 73, 74 and/or 55 is fed to one or more of the conduits 61-63. The externally fired boiler 55 can preferably be integrated in the boiler 73. The water content in the working fluid can be complemented during operating conditions where the system's humidification level is low, (e.g. when large amounts of steam are extracted for an external process), by injecting high-pressure steam after the final compression stage. Steam at a lower pressure can be injected prior to the final compression stage and even be partially utilised, as mentioned previously, for external process steam.

The externally fired boiler 55 can be utilised for all three of the above-mentioned purposes and is particularly vital during start-up and part-load operation. Further, steam from boiler 55 can be used to maintain the system components, especially the turbine groups, at a high temperature while the process is shut down. By doing so, the start-up time of the system can be considerably shortened. While boiler 55 is shown as a separate unit in FIG. 2-3, an alternative configuration with the same purpose is to fire boiler 73 in stream 49 with the additional fuel 56 and air 57 when needed is shown in FIG. 1.

It can be seen in FIG. 2 that relatively cold water from the base of the humidification tower 97 is led through heat exchanger 96, a so-called intercooler, where the water is heated while cooling the air stream 45 extracted from compressor 12. This heat is then used to evaporate a part of the water stream into the compressed air in the humidification tower 97. In a similar way, heat is extracted from the air stream 92 by using some of the cold outlet water from the humidification tower 97 in heat exchanger 98. This further aids the humidification process in 97 by ensuring the inlet air is cold. A water stream 94, extracted from the base of the humidification tower 97, is hence led through heat exchanger 98, cooling the air stream 92 and heating the water stream 94. Thereafter, this heat is used in the tower 97 to evaporate a part of this water stream into the compressed air. Hot water obtained from unit 70 is also utilised in the humidification tower 97.

Figure 3:
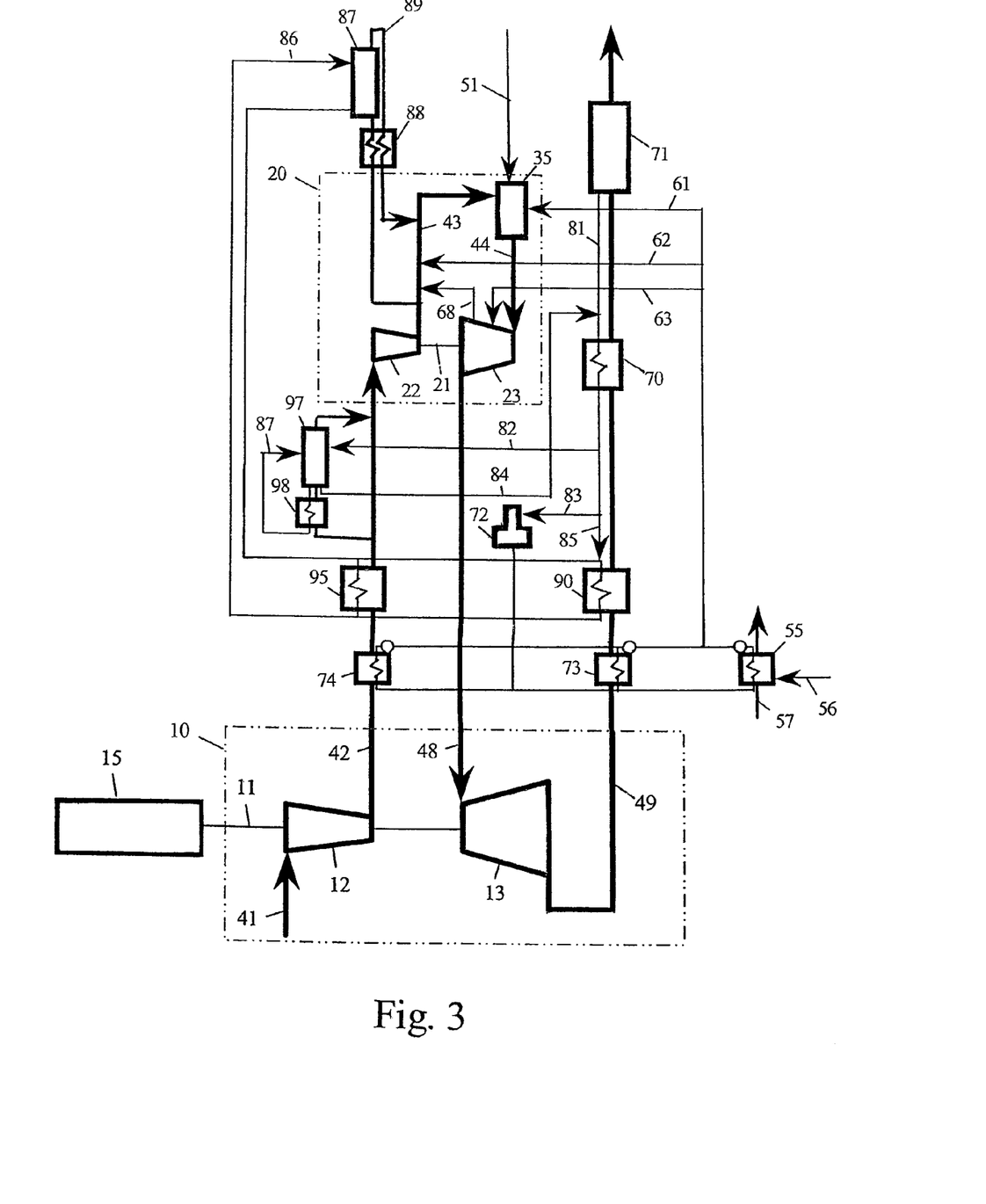
FIG. 3 illustrates a further development of the gas turbine cycle according to FIG. 2, with heat utilised by a boiler in one stage after the first gas turbine group's compressor 12, humidification of the air stream between the compressors by utilising heat from the flue gas economiser 70, further humidification of the air stream between compressor 22 and the combustion device 35, where heat is reclaimed from the compressor intercooler 95 and the flue gas economiser 90, and a configuration where useful work is extracted from the first gas turbine group 10 only.

FIG. 3 shows a further development of the humidification configuration described in FIG. 2, whereby a humidification tower is also applied prior to combustion in combustion chamber 35. Heat from the flue gas and the compressed air is utilised for complementary humidification in a humidification device 87, where all, or a part of, the pressurised air from compressor 22 partakes. The recuperator 88 associated with the humidification tower 87 is placed in stream 43 between compressor 22 and combustion chamber 35. As shown in FIG. 3, heat is transferred to the humidification circuit from the heat exchanger 95 placed in stream 42 between compressor 12 and compressor 22. Preferably, heat exchanger 95 should be placed as shown in FIG. 3 between the boiler 74 and the humidification tower 97 that was described in FIG. 2. In addition, heat is transferred to the humidification circuit from the flue gas through heat exchanger 90. Hot water is further added to the humidification circuit 86 to via stream 85. This heat is transferred to the humidification circuit at those temperature levels most suitable for the total process, although not above the boiling point at the humidification tower pressure. The heat exchanger 88, which is inserted between compressor 22 and the humidification device 87, comprises of a recuperator which allows the complementary humidification that occurs in unit 87 to occur with the lowest possible loss in temperature in stream 43 before it enters the combustion chamber 35. The inlet air to the humidification device 87 is thereby led through the heat exchanger 88 and cooled by the humidified outlet air from the humidification device 87. Therefore, heat exchanger 88 reheats the intake air to the combustion chamber 35 and thereby maximises the performance improvement that is possible with the complementary humidification device 87.

In an especially advantageous configuration, the gas which enters the first group's turbine 13 has a temperature of at most 1200° C., preferably between 400-1000° C., and a pressure of 5-60 bar. Furthermore, the system should preferably be designed so that the flue gas exit temperature from turbine 13 is in the region of 200-500° C.

The exit temperature from compressor 12 of the first turbine group 10 is chosen and configured to enable the production of steam used to cool the high-pressure turbine 23 and/or the combustion chamber 35. The operational characteristics of the system are suitably chosen such that at least 60%, preferably 70-80%, or most desirably 90% of the oxygen contained the air stream 41-43 is consumed during combustion. Of the work produced by the gas turbine cycle, at least 10% should be transferred via the power transmission of the second gas turbine group 20. Even more preferably, 20% of the useful work should be transferred from the second gas turbine group 20. In the present described especially advantageous configuration, 30-40% of the system's output of useful work should be transferred via the power transmission of the second gas turbine group 20.

The above mentioned gas turbine configuration is devised to enable the adaptation of existing gas turbines to humidified operation with a minimal amount of re-design, be it for existing plants or newly-built plants. However, it is conceivable that the first gas turbine group could be significantly re-designed specifically for humidified cycles.

One such re-design could be to decrease the pressure ratio across the first gas turbine group's expander 13 by removing turbine stages such that the first gas turbine group's expander 13 only produces enough power to run its corresponding compressor 12. Hence, in this configuration, useful work is only extracted from the shaft of the second gas turbine group 20 as illustrated in FIG. 2 and the operation and configuration of the entire gas, turbine cycle is somewhat simplified. As mentioned, this con-figuration would require a significant re-design and is more difficult and costly to apply to existing gas turbine power plants.

Another such re-design could be to increase the pressure ratio across the first gas turbine group's expander 13 by adding turbine stages such that the second gas turbine group's expander 23 only produces enough power to run its corresponding compressor 22. Hence, in this configuration, useful work is only extracted from the shaft of the first gas turbine group 10 as illustrated in FIG. 3 and the configuration of the entire gas turbine cycle is somewhat simplified. Also this configuration would require a significant re-design and is more difficult and costly to apply to existing gas turbine power plants.

The invention claimed is:

1. A method of operating a gas turbine power plant wherein the power plant is comprised of:
   a first gas turbine group, comprised of a first compressor and a first turbine which are connected mechanically with one another,
   a second gas turbine group comprised of a combustion device, which is placed in a gas flow stream between the first group's first compressor and first turbine, a second compressor, a fuel injection device, a combustion chamber and a second turbine, the second gas turbine group's second compressor and second turbine are mechanically coupled to one another,
   at least one of the first and second gas turbine groups having a device for extraction of useful work,
   the method comprising:
   producing flue gas from the first turbine and heating a first flow of water and/or steam with heat from the flue gas from the first group's turbine, compressing the gas stream from the first turbine in the first compressor, using heat from the compressed gas stream for heating further amounts of water and/or steam with heat from the gas stream that is compressed by the first group's first compressor,
   injecting the produced water and/or steam into the gas flow stream in such amounts that at least 60% of the oxygen content of the air in the gas flow stream is consumed through combustion in the combustion device, and
   feeding combustion gas into the second turbine of the second gas turbine group at a pressure in the range 50-300 bar.

2. A method according to claim 1, further comprising injecting the further amount of water into the gas stream between the first group's first compressor and the second gas turbine group's second compressor.

3. A method according to claim 2, wherein the further amounts of water that entirely or partially have the form of steam optionally are introduced in the gas stream downstream of the second gas turbine group's compressor, and are introduced in such amounts that at least 60% of the oxygen content of the air in the gas stream is consumed through combustion in the combustion device.

4. A method according to claim 1, further comprising choosing operational characteristics such that the temperature of the gas flow entering the first gas turbine group's first turbine is at most 1200° C. and the pressure of the gas flow is between 5-60 bar.

5. A method according to claim 1, further comprising choosing operational characteristics that cause a flue gas exit temperature from the first gas turbine group's first turbine in the range of 200-500° C.

6. A method according to claim 1, wherein the first gas turbine group comprises a gas turbine unit, which is optimized for non-humidified operation, wherein the gas turbine unit has one or multiple shafts and includes intercooling.

7. A method according to claim 1, further comprising arranging and operating the second gas turbine group's second turbine so that the pressure of the gas stream from the first gas turbine group's first compressor and to the first gas turbine group's first turbine, respectively, is re-allotted such that the first gas turbine group is well-suited to operate with the media and flow data associated with humidified cycles.

8. A method according to claim 6, further comprising regulating inlet guide vanes of the first compressor of the first gas turbine group to reduce the flow of air obtained during operation of the power plant, and reducing the capacity of the first gas turbine group's first compressor through removing one or more compressor stages thereof.

9. A method according to claim 1, further comprising complementing the first gas turbine group's first compressor with an extraction device and operating the extraction device to extract the compressed air, which is sealed against the axle, and complementing the first gas turbine group's first turbine with an injection device, which is also sealed against the axle, and returning the flue gas by injection into the first gas turbine group's first turbine.

10. A method according to claim 1, further comprising:
    choosing an exit temperature of the first gas turbine group's first compressor to enable production of steam of sufficiently high pressure to be used to cool at least one of the second turbine and the combustion chamber of the second gas turbine group.

11. A method according to claim 1, further comprising introducing combustion gases into the second gas turbine group's second turbine, the combustion gases having a pressure in the region of 50-300 bar and a temperature in the region of 1000-2000 K.

12. A method according to claim 1, further comprising humidifying the gas exit flow from the second gas turbine group's second compressor prior to the second gas turbine group's combustion device, by passing at least a part of the gas flow through a humidifier, heat exchanging inlet and outlet gas streams from the heat exchanger via a recuperator, where inlet water to the humidifier is heated with heat from the gas outlet stream from at least one of the first compressor and the turbine of the first gas turbine group.

13. A method according to claim 1, further comprising using at least a part of a water content of the flue gases to provide the process with at least one of feed water and steam.

14. A method according to claim 1, further comprising regulating the output of work from the process through changing the amount of water that is transferred to the gas stream, whereby a lower power output is obtained through a lower degree of humidification.

15. A method according to claim 1, further comprising introducing at least a part of the steam used for cooling into the gas stream after use for cooling, in the second gas turbine group's combustion chamber, for further use as the working fluid.

16. A method according to claim 1, wherein no significant amount of heat is transferred to the gas stream between the second gas turbine group's second turbine and the first group's first turbine.

17. A method according to claim 1, further comprising regulating the second gas turbine group's second compressor by regulating a lead guide vane or by regulating rotational speed.

18. A method according to claim 1, wherein at least 10% of the useful work obtained from the process is extracted via a transmission of the second gas turbine group.

19. A method according to claim 1, further comprising
arranging a heat exchanger in the hot air flow downstream of the first compressor of the first gas turbine group, and flowing water through the heat exchanger for heating of the water,
preheating the water in an exhaust gas heat exchanger upstream of a flue gas condenser from which the exhaust gas is exhausted from the first gas turbine group to the environment, producing the water by the flue gas condenser and heating a part flow of the water, in a preheated condition, by a heat exchanger, wherein the water is passed by flue gas from the first turbine of the first gas turbine group, wherein the water which is heated by the heat exchangers is at least partially transformed into steam, and the water is fed into one of the combustion chamber, the second turbine of the second gas turbine group or the compressed gas flow from the compressor of the second gas turbine group, for cooling the second turbine of the second gas turbine group.

20. A method according to claim 19, wherein the water, which is fed into the combustion chamber, at least partially has the form of steam.

21. A method according to claim 19, further comprising producing steam by an external boiler and feeding the produced steam into one of the combustion chamber, the second turbine of the second gas turbine group or the compressed gas flow from the compressor of the second gas turbine group, for cooling of the second turbine of the second gas turbine group.

* * * * *

UNITED STATES PATENT AND TRADEMARK OFFICE
CERTIFICATE OF CORRECTION

PATENT NO. : 7,721,552 B2 Page 1 of 1
APPLICATION NO. : 10/558849
DATED : May 25, 2010
INVENTOR(S) : Hansson et al.

It is certified that error appears in the above-identified patent and that said Letters Patent is hereby corrected as shown below:

On the title page, insert the following:

--(63) Related U.S. Application Data: 35 U.S.C. § 371 of PCT/SE2004/000822, filed May 28, 2004.--.

Signed and Sealed this

Twenty-fourth Day of August, 2010

David J. Kappos
*Director of the United States Patent and Trademark Office*